(12) United States Patent
Xie et al.

(10) Patent No.: US 8,493,907 B2
(45) Date of Patent: Jul. 23, 2013

(54) FREQUENCY OFFSET ESTIMATION SCHEME IN SCHEDULED BASED WIRELESS SYSTEM

(75) Inventors: Hongyu Xie, San Diego, CA (US); Yuan Zhuang, San Diego, CA (US); Murat Mese, Rancho Palos Verdes, CA (US); Brima Ibrahim, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 213 days.

(21) Appl. No.: 13/172,075

(22) Filed: Jun. 29, 2011

(65) Prior Publication Data

US 2013/0003568 A1    Jan. 3, 2013

(51) Int. Cl.
H04B 7/204    (2006.01)

(52) U.S. Cl.
USPC .......................................... 370/319; 370/445

(58) Field of Classification Search
USPC ................ 370/389, 319, 344, 445, 349, 471, 370/281, 295
See application file for complete search history.

(56) References Cited

U.S. PATENT DOCUMENTS 7,298,772 B1 * 11/2007 Neerudu et al. ............... 375/136
2009/0233564 A1 * 9/2009 Greenberg et al. ........ 455/226.1

OTHER PUBLICATIONS

Paul H. Moose, A Technique for Orthogonal Frequency Division Multiplexing Frequency Offset Correction, IEEE Transactions on Communications, Oct. 1994, 7 Pages, vol. 42, No. 10.

Timothy M. Schmidl, Donald C. Cox, Robust Frequency and Timing Synchronization for OFDM, IEEE Transactions on Communications, Dec. 1997, 9 Pages, vol. 45, No. 12.

Andreas Czylwik, Synchronization For Single Carrier Modulation With Frequency Domain Equalization, Vehicular Technology Conference, 1998, VTC 98, IEEE 48th, 5 Pages.

Michele Morelli, Umberto Mengali, An Improved Frequency Offset Estimator for OFDM Applications, IEEE Communications Letters, Mar. 1999, 3 Pages, vol. 3, No. 3.

V.S. Abhayawardhana, I.J. Wassell, Residual Frequency Offset Correction for Coherently Modulated OFDM Systems in Wireless Communication, Vehicular Technology Conference, VTC Spring 2002, IEEE 55th, 5 Pages.

Chih-Peng Li, Po-Lin Chen, Tsui-Tsai Lin, Residual Carrier Frequency Offset Tracking for OFDM-Based Systems, The 2004 IEEE Asia-Pacific Conference on Circuits and Systems, Dec. 6-9, 2004, 4 pages.

* cited by examiner

*Primary Examiner* — Brenda H Pham
(74) *Attorney, Agent, or Firm* — Garlick & Markison (57) ABSTRACT

A technique to provide frequency offset estimation for packets transmitted during a service period allocated strictly for designated source and destination devices. The destination device obtains coarse and fine frequency offset estimation from the short and long preambles. A residual frequency offset is tracked for the data blocks and combined with the coarse and fine frequency offset to obtain a total frequency offset to apply to the data blocks. The total frequency offset value at the end of the first packet is saved and, instead of again estimating the coarse and fine frequency offset values with the short and long preambles of the second packet, the saved total frequency offset value is used as the initialization value to add to the residual frequency offset in the second packet. The saved offset value at the end of each packet becomes the initialization value for the subsequent packet.

18 Claims, 6 Drawing Sheets

FREQUENCY OFFSET ESTIMATION SCHEME IN SCHEDULED BASED WIRELESS SYSTEM

BACKGROUND OF THE INVENTION

1. Technical Field of the Invention

The embodiments of the invention relate to wireless communications and, more particularly, to frequency offset estimation in wireless receivers.

2. Description of Related Art

Various wireless communication systems are known today to provide links between devices, whether directly or through a network. Such communication systems range from national and/or international cellular telephone systems, the Internet, point-to-point in-home systems, as well as other systems. Communication systems typically operate in accordance with one or more communication standards or protocol. For instance, wireless communication systems may operate using protocols, such as IEEE 802.11, Bluetooth™, advanced mobile phone services (AMPS), digital AMPS, global system for mobile communications (GSM), code division multiple access (CDMA), local multi-point distribution systems (LMDS), multi-channel-multi-point distribution systems (MMDS), as well as others.

For each wireless communication device to participate in wireless communications, it generally includes a built-in radio transceiver (i.e., receiver and transmitter) or is coupled to an associated radio transceiver (e.g., a station for in-home and/or in-building wireless communication networks, modem, etc.). Typically, the transceiver includes a baseband processing stage and a radio frequency (RF) stage. The baseband processing provides the conversion from data to baseband signals for transmitting and baseband signals to data for receiving, in accordance with a particular wireless communication protocol. The baseband processing stage is coupled to a RF stage (transmitter section and receiver section) that provides the conversion between the baseband signals and RF signals. The RF stage may be a direct conversion transceiver that converts directly between baseband and RF or may include one or more intermediate frequency stage(s).

Furthermore, wireless devices typically operate within certain radio frequency ranges or band established by one or more communication standards or protocols. The 2.4/5.8 GHz Bands that encompass current WiFi and Bluetooth™ protocols have limited data throughput. A newer 60 GHz standard, being developed by the Wireless Gigabit Alliance (WiGig or WGA) and IEEE TGad, pursues higher throughput of up to 7 Gbps in short-range wireless data transmissions. Using 60 GHz technology, high data rate transfers, such as real-time uncompressed/compressed high-definition (HD) video and audio streams, may be transferred between two or more devices. Some examples of transfers between two devices include data transfers between a conference room projector and a laptop, between a camcorder and a display, or between a network storage server and a laptop. Other examples abound. Due to this inherent real-time requirement for the targeting applications, 60 GHz standard explicitly defines a Quality of Service (QoS) requirement for traffic streams to meet high throughput among devices.

Frequency offset occurs between a transmitter and a receiver in a wireless communication. The frequency offset may be caused by a variety of factors, but two main causes are due to the mismatch between the transmitter local oscillator (LO) and the receiver LO, and the distortion of the transmitted signal in the channel during transmit. When the transmitted signal reaches the receiver, the receiver attempts to estimate this frequency offset, in order to provide compensation at the receiver for the offset between the transmitter and the receiver.

Traditional wireless local area network (WLAN) receivers use short and long preambles located at the beginning of each received packet to respectively estimate the coarse frequency offset $\Delta f_{coarse}$ and fine frequency offset $\Delta f_{fine}$. The sum of the coarse and fine frequency offsets (denoted as $\Delta f_{coarse+fine}$) is then used as an estimation of the actual frequency offset (denoted as $\Delta f$) existing between the wireless transmitter and receiver. The receiver can conduct time domain phase rotation at the rate of $\Delta f_{coarse+fine}$ to compensate for the frequency offset. Various techniques are known to provide for $\Delta f_{coarse+fine}$ compensation. See for example, "An Improved Frequency Offset Estimator for OFDM Applications," Michele Morelli and Umberto Mengali, IEEE Communications Letters, Vol. 3, No. 3, March 1999, pp. 75-77; and "Robust Frequency and Timing Synchronization for OFDM," Timothy M. Schmidl and Donald C. Cox, IEEE Transactions on Communications, Vol. 45, No. 12, December 1997, pp. 1613-1621.

However, the actual offset is $\Delta f = \Delta f_{coarse+fine} + \Delta f_{residual}$, where $\Delta f_{residual}$ denotes the residual frequency error after the $\Delta f_{coarse+fine}$ compensation. The receiver may choose to track $\Delta f_{residual}$ for the rest of the packet. For example, in OFDM systems, the receiver can extract the remaining phase error, denoted as $\epsilon_{phase}$, from the pilot tones embedded in each data symbol for all the remaining data symbols in the packet and feed it into a phase-locked loop (PLL) based tracking loop. Integrated over all previous data symbols in the packet, the PLL outputs an estimate of $\Delta f_{residual}$ (denoted as $\Delta f^*_{residual}$) for the current data symbol. See for example, "Residual Frequency Offset Correction for Coherently Modulated OFDM Systems in Wireless Communication," V. S. Abhayawardhana and I. J. Wassell, University of Cambridge, UK, IEEE 55th Vehicular Technology Conference, 2002, pp. 777-781; and "Residual carrier Frequency Offset Tracking for OFDM-based Systems," Chih-Peng Li, Po-Lin Chen and Tsui-Tsai Lin, The 2004 IEEE Asia-Pacific Conference on Circuits and Systems, Dec. 6-9, 2004, pp. 989-992.

Since current WLAN protocols use CSMA/CA (Carrier Sense Multiple Access with Collision Avoidance) based wireless channel access mechanism, a WLAN receiver has no way of knowing whether the next packet is addressed to it or other receivers in the wireless network until the Receive Address field is decoded. Accordingly, the above mentioned frequency offset estimation and compensation scheme is limited within a single packet and the process is repeated all-over again at the beginning of the subsequent packet. A drawback of this approach is that $\Delta f_{coarse+fine}$ is recalculated for each packet, even if the subsequent packet is from the same source as the previous packet. Another drawback is that the $\Delta f_{residual}$ is left uncompensated at the beginning of a packet, since the $\Delta f_{residual}$ tracking does not commence until later in the packet.

In stances where there is sufficient signal-to-noise ratio (SNR), the value of $\Delta f_{residual}$ may not be significant to have a high impact in packet recovery. However, in low SNR situations, the $\Delta f_{residual}$ may be significant due to the $\Delta f_{coarse+fine}$ accuracy degradation. For systems operating in the 60 GHz frequency band, significant loss in link margin may occur as compared to similar systems operating at 2.4-5.8 GHz, or even lower frequency band, due to the significantly increased free space loss. As a result, 60 GHz systems typically rely on high antenna gains (via beamforming) to compensate for the loss in link margin in order to achieve useful range of operation.

In addition, many critical packet-related information fields are contained in the packet PLCP Header, which is located after the preambles. Large, uncompensated $\Delta f_{residual}$ may reduce the chance of correctly decoding the PLCP Header, as well as the subsequent data. This is especially true for OFDM systems, due to the constellation rotation and inter-carrier-interference (ICI) between the sub-carriers introduced by uncompensated $\Delta f_{residual}$.

Accordingly, there is a need for having a robust frequency offset estimation and compensation scheme in low SNR situation for higher frequency bands, such as the 60 GHz band. This need is more so for applications requiring high QoS (Quality of Services), such as high definition audio/video under the new 60 GHz operational band standard proposed by WiGiG/IEEE. Because the retransmission of corrupted data packets not only wastes valuable wireless channel time but also introduces additional packet delivery latency, wherein such excessive retransmission and buffering due to repeated failures can ruin the user experience.

DETAILED DESCRIPTION OF THE INVENTION

The embodiments of the present invention may be practiced in a variety of wireless communication devices that operate in a wireless network. The examples described herein pertain to devices that operate approximately within the 60 GHz Band, which is in the range of millimeter wave transmissions. However, the invention need not be limited to the 60 GHz Band. Furthermore, the examples described herein pertain to specific designations, such as a Service Period (SP). However, the invention need not be limited to such specific applications.

Figure 1:
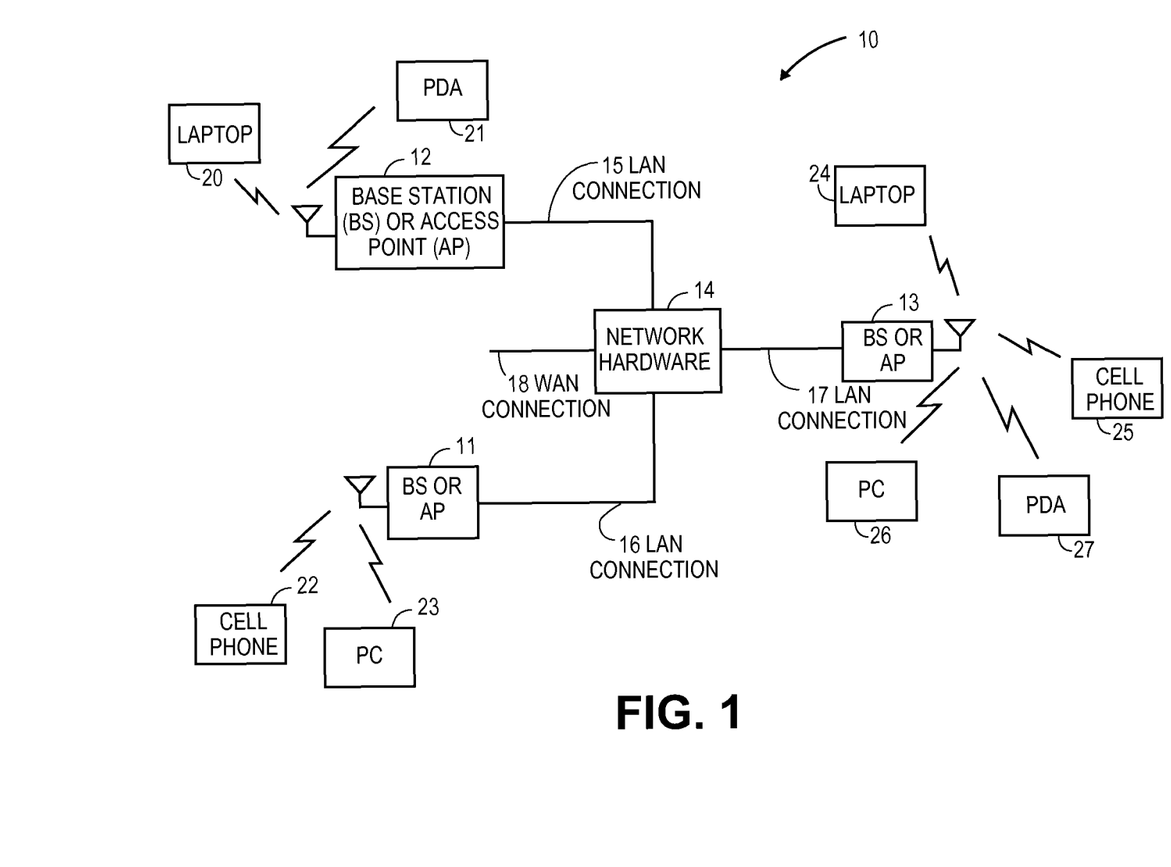
FIG. 1 is a block diagram showing a wireless communication system in accordance with one embodiment for practicing the present invention.

FIG. 1 illustrates one environment for practicing the present invention. FIG. 1 shows a communication system 10 that includes a plurality of base stations (BS) and/or access points (AP) 11-13, a plurality of wireless communication devices 20-27 and a network hardware component 14. The wireless communication devices 20-27 may be laptop computers 20 and 24, personal digital assistants 21 and 27, personal computers 23 and 26, cellular telephones 22 and 25, and/or any other type of device that supports wireless communications.

The base stations or access points 11-13 may be operably coupled to network hardware 14 via respective local area network (LAN) connections 15-17. Network hardware 14, which may be a router, switch, bridge, modem, system controller, etc., may provide a wide area network (WAN) connection 18 for communication system 10. Individual base station or access point 11-13 generally has an associated antenna or antenna array to communicate with the wireless communication devices in its area. Typically, the wireless communication devices register with a particular base station or access point 11-13 to receive services within communication system 10. For direct connections (i.e., point-to-point communications), wireless communication devices may communicate directly via an allocated channel.

Typically, base stations are used for cellular telephone systems (including 3G and 4G systems) and like-type systems, while access points are used for in-home or in-building wireless networks. Regardless of the particular type of communication system, each wireless communication device includes a built-in radio and/or is coupled to a radio. The radio includes a linear amplifier and/or programmable multi-stage amplifier to enhance performance, reduce costs, reduce size, and/or enhance broadband applications. The radio also includes, or is coupled to, an antenna or antennas having a particular antenna coverage pattern for propagating of outbound RF signals and/or reception of inbound RF signals. Antennas may be directional antennas.

Figure 2:
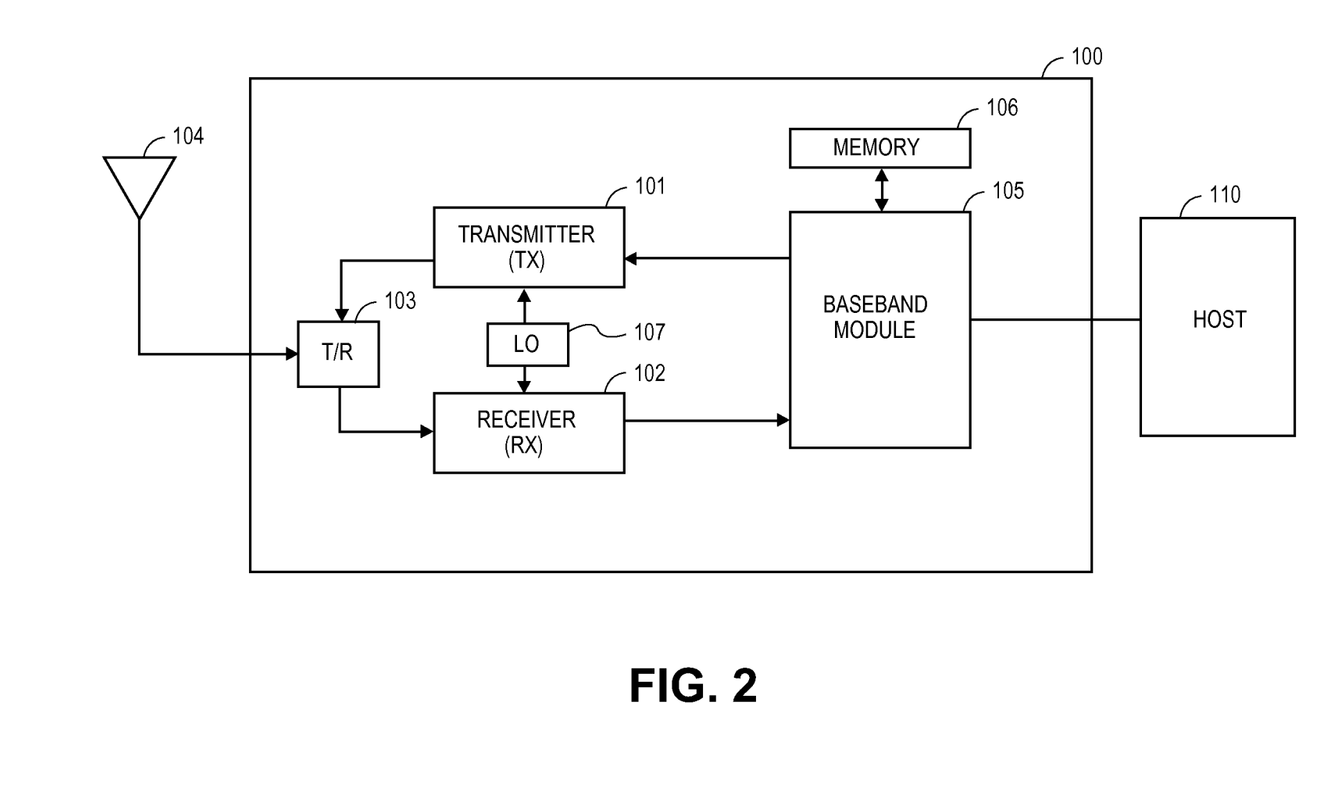
FIG. 2 is a schematic block diagram showing an embodiment of a wireless communication device for practicing the present invention.

FIG. 2 is a schematic block diagram illustrating part of a wireless communication device 100 that includes a transmitter (TX) 101, receiver (RX) 102, local oscillator (LO) 107 and baseband module 105. Baseband module 105 provides baseband processing operations. In some embodiments, baseband module 105 is or includes a digital-signal-processor (DSP). Baseband module 105 is typically coupled to a host unit, applications processor or other unit(s) that provides operational processing for the device and/or interface with a user.

In FIG. 2, a host unit 110 is shown. For example, in a notebook or laptop computer, host 110 may represent the computing portion of the computer, while device 100 is utilized to provide WiFi and/or Bluetooth components for communicating wirelessly between the computer and an access point and/or between the computer and a Bluetooth device. Similarly, for a handheld audio or video device, host 110 may represent the application portion of the handheld device, while device 100 is utilized to provide WiFi and/or Bluetooth components for communicating wirelessly between the handheld device and an access point and/or between the handheld device and a Bluetooth device. Alternatively, for a mobile telephone, such as a cellular phone, device 100 may represents the radio frequency (RF) and baseband portions of the phone and host 110 may provide the user application/interface portion of the phone. Furthermore, device 100 may be incorporated in one or more of the wireless communication devices 20-27 shown in FIG. 1.

A memory 106 is shown coupled to baseband module 105, which memory 106 may be utilized to store data, as well as program instructions that operate on baseband module 105. Various types of memory devices may be utilized for memory 106. It is to be noted that memory 106 may located anywhere within device 100 and, in one instance, it may also be part of baseband module 105.

Transmitter 101 and receiver 102 are coupled to an antenna 104 via transmit/receive (T/R) switch module 103. T/R switch module 103 switches the antenna between the transmitter and receiver depending on the mode of operation. In other embodiments, separate antennas may be used for transmitter 101 and receiver 102, respectively. Furthermore, in other embodiments, multiple antennas or antenna arrays may be utilized with device 100 to provide antenna diversity or multiple input and/or multiple output, such as MIMO, capabilities.

At frequencies in the lower gigahertz range, omni-directional antennas provide adequate coverage for communicating between wireless devices. Thus, at frequencies about 2.4/5.8 GHz, one or more omni-directional antenna(s) is/are typically available for transmitting and receiving. However, at higher frequencies, directional antennas with beamforming capabilities are utilized to direct the beam to concentrate the transmitted energy, due to the limited range of the signal. In these instances, antenna arrays allow for directing the beam in a particular direction. The 60 GHz band as specified by the Wireless Gigabit Alliance (WGA or WiGig) and IEEE, specifies that 60 GHz band devices utilize directional antennas in order to direct the transmitted spectrum energy, such as beamforming.

Outbound data for transmission from host unit 110 are coupled to baseband module 105 and converted to baseband signals and then coupled to transmitter 101. Transmitter 101 converts the baseband signals to outbound radio frequency (RF) signals for transmission from device 100 via antenna 104. Transmitter 101 may utilize one of a variety of up-conversion or modulation techniques to convert the outbound baseband signals to outbound RF signal. Generally, the conversion process is dependent on the particular communication standard or protocol being utilized.

In a similar manner, inbound RF signals are received by antenna 104 and coupled to receiver 102. Receiver 102 then converts the inbound RF signals to inbound baseband signals, which are then coupled to baseband module 105. Receiver 102 may utilize one of a variety of down-conversion or demodulation techniques to convert the inbound RF signals to inbound baseband signals. The inbound baseband signals are processed by baseband module 105 and inbound data is output from baseband module 105 to host unit 110.

LO 107 provides local oscillation signals for use by transmitter 101 for up-conversion and by receiver 102 for down-conversion. In some embodiments, separate LOs may be used for transmitter 101 and receiver 102. Although a variety of LO circuitry may be used, in some embodiments, a PLL is utilized to lock the LO to output a frequency stable LO signal based on a selected channel frequency.

It is to be noted that in one embodiment, baseband module 105, LO 107, transmitter 101 and receiver 102 are integrated on the same integrated circuit (IC) chip. Transmitter 101 and receiver 102 are typically referred to as the RF front-end. In other embodiments, one or more of these components may be on separate IC chips. Similarly, other components shown in FIG. 2 may be incorporated on the same IC chip, along with baseband module 105, LO 107, transmitter 101 and receiver 102. In some embodiments, the antenna 104 may also be incorporated on the same IC chip as well. Furthermore, with the advent of system-on-chip (SOC) integration, host devices, application processors and/or user interfaces, such as host unit 110, may be integrated on the same IC chip along with baseband module 105, transmitter 101 and receiver 102.

Additionally, although one transmitter 101 and one receiver 102 are shown, it is to be noted that other embodiments may utilize multiple transmitter units and receiver units, as well as multiple LOs. For example, diversity communication and/or multiple input and/or multiple output communications, such as multiple-input-multiple-output (MIMO) communication, may utilize multiple transmitters 101 and/or receivers 102 as part of the RF front-end.

Figure 3:
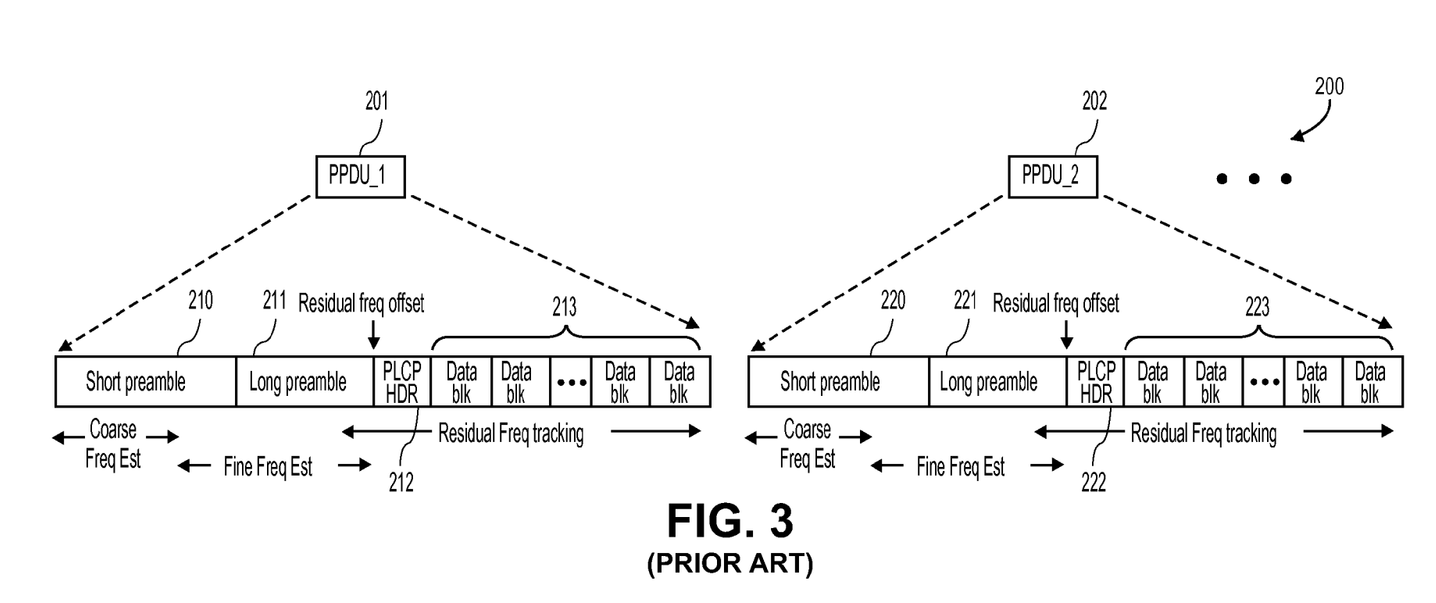
FIG. 3 is an illustration showing a prior art technique of using short and long preambles of each packet to provide coarse and fine frequency offset estimation, as well as tracking for residual frequency offset.

As noted in the Background section above, frequency offset occurs between a transmitter and a receiver in a wireless communication. Two main causes of the offset are due to the mismatch between the transmitter LO and the receiver LO, and the distortion of the transmitted signal in the channel during transmit. FIG. 3 shows a traditional technique 200 in which short and long preambles located at the beginning of each received packet are used to respectively estimate the coarse frequency offset $\Delta f_{coarse}$ and fine frequency offset $\Delta f_{fine}$. In FIG. 3, two consecutive PPDUs (PLCP Protocol Data Unit, where PLCP is an acronym for Physical Layer Convergence Procedure) 201, 202 are shown. In simpler terms, each PPDU is referred to as a packet. In the example, only two PPDUs, noted as PPDU_1 and PPDU_2 are shown, but there could be additional PPDUs.

PPDU_1 is comprised of a short preamble 210, long preamble 211, PLCP (Physical Layer Convergence Procedure) header 212 and one or more data blocks (also data symbols or data components) 213. Likewise, PPDU_2 is comprised of a short preamble 220, long preamble 221, PLCP header 222 and one or more data blocks (also data symbols or data components) 223. When PPDU_1 is received, the receiver commences the coarse and fine frequency offset estimation. As noted above, the coarse frequency estimation is obtained from the short preamble, followed by the use of the long preamble to estimate the fine frequency estimation. Once, $\Delta f_{coarse+fine}$ is obtained, the $\Delta f_{coarse+fine}$ estimation offset is applied to PPDU_1. The $\Delta f_{residual}$ tracking commences with the PLCP header to determine the residual frequency offset for the data blocks. The tracking is maintained throughout the data blocks, so that the phase offset is tracked and applied to the respective data blocks. At each data block the tracked value of $\Delta f_{residual}$ is combined with $\Delta f_{coarse+fine}$ to obtain the total frequency offset $\Delta f$. The tracking is typically performed by phase accumulation throughout the data blocks 213 to determine the accumulated $\Delta f_{residual}$ at each data block and applied as offset compensation to the data being recovered by the receiver.

The $\Delta f_{coarse+fine}$ estimation and $\Delta f_{residual}$ tracking are performed all-over again with PPDU_2. Likewise, for any subsequent PPDU, the cycle of obtaining the $\Delta f_{coarse+fine}$ estimation and $\Delta f_{residual}$ tracking are repeated again in full. The prior art technique performs the $\Delta f_{coarse+fine}$ estimation with each PPDU, because the receiver does not know if the subsequent PPDU (e.g. PPDU_2) is transmitted from the same transmitter as the previous PPDU (e.g. PPDU_1). It is possible that PPDU_2 is transmitted from a different source than PPDU_1. As will be described below, the practice of the present invention removes the need for calculating the $\Delta f_{coarse+fine}$ estimation with every PPDU with service period scheduling protocols, such as the 60 GHz band protocol contemplated by WiGig/IEEE. That is, to support high throughput QoS traffic between a transmitter-receiver pair, the 60 GHz protocol introduces a concept of a scheduled service period (SP). The present invention utilizes this concept of a SP to remove the need for performing $\Delta f_{coarse+fine}$ estimation multiple times for PPDUs in the same SP.

Figure 4:
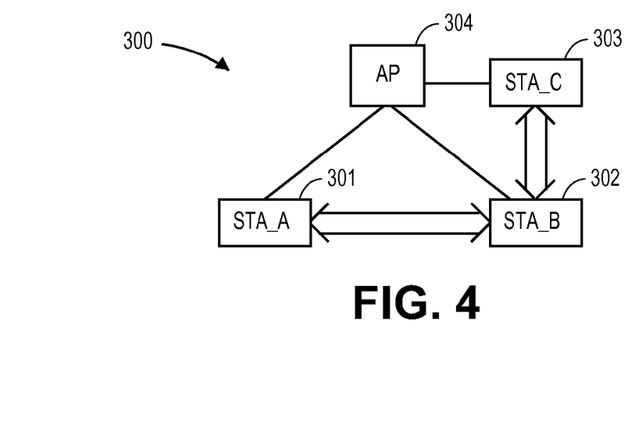
FIG. 4 is a block diagram of a network, such as a Basic Service Set (BSS), in which multiple STAs are present in the network and allocations of service periods for the STAs are controlled by a network control point in practicing one embodiment of the invention.

FIG. 4 shows wireless network which forms or is part of a Basic Service Set (BSS) 300. In one embodiment BSS 300 is a Personal Basic Service Set (PBSS) that forms a personal or self-contained network. In another embodiment BSS 300 is an infrastructure Basic Service Set (IBSS) that forms a much larger infrastructure network. Still in other embodiments, BSS 300 may form other networks, including a combination of wireless and wired networks.

In the shown embodiment, BSS 300 is comprised of a control point and a plurality of stations (STAs) 301, 302, 303 (301-303), also noted as STA_A, STA_B and STA_C, which STAs 301-303 are under control of a control point. It is to be noted that only 3 STAs are shown, but BSS 300 may be comprised of less STAs or more STAs than that shown. The control point may be a Personal BSS Control Point (PCP), Access Point (AP), or some other device. Hereinafter in the description, the control point is referred to as AP 304. Note that AP 304 may be implemented as or as part of BS/AP 11-13 of FIG. 1. Likewise, STAs 301-303 may be equivalent to the devices shown about each of BS/AP 11-13, as well as other devices.

BSS 300 employs a particular communication protocol or standard to provide the wireless communication among the devices within BSS 300. In one embodiment, BSS 300 operates within the 60 GHz band as proposed by WiGig/IEEE. In other embodiments, BSS 300 may operate in other bands or frequency ranges. When operating in the 60 GHz band, components within BSS 300 generally use directional antennas to direct the transmitted beam (e.g. beamforming). Thus, AP 304 and STAs 301-303 each utilize a directional antenna to communicate with each other within BSS 300.

Each STA communicates with AP 304 and may communicate with other STAs through AP 304. However, one or more STAs may also communicate directly with other STAs through direct peer-to-peer link, as shown by a direct connection between STA_A and STA_B, as well the direct connection between STA_B and STA_C in FIG. 4. It is noted that STA_A may in some instances communicate directly with STA_C. However, this direct communication is still under control of AP 304. That is, the bandwidth for BSS 300 is under control of AP 304, so that AP 304 schedules and allocates the service period (SP) to each of the STAs in order to control when each STA communicates within BSS 300.

In a typical 60 GHz band application, a traffic stream (TS) is established between two STAs or between a STA and AP 304. When two STAs communicate with each other, one STA is the source STA and the other STA is the destination STA. For example, in one instance, STA_A may be the source STA and STA_B may be the destination STA in FIG. 4. In another instance STA_C may be the source STA and STA_B may be the destination STA. The source STA sends an ADDTS (Add Traffic Stream) Request frame to AP 304 to initiate the link for transferring data to the destination STA. The ADDTS request defines the timing and traffic requirements for the data transfer. Once the TS is admitted by AP 304, a scheduler within AP 304 schedules and allocates the applicable SP and announces the SP allocation information. AP 304 then transmits the scheduling information to both the source STA and destination STA for the data transfer. The STAs receive and parse the schedule and become aware of the start time, the duration, and the period of the SP allocation for that station. Subsequently, the two STAs will initiate the data transfer at the designated SP time slot or slots.

Still in other embodiments, other schemes may allow for scheduling of a service period. For example, a Transmit Opportunity (TXOP) approach may be used in which a contention based system may be used in which a particular STA may contend for an extended period for transmitting the data to a destination, wherein during the extended period, other STAs stay off the air and not interfere with the scheduled transmission. In effect the extended period of TXOP operates equivalent to an uninterrupted period provided with a SP, but with the TXOP scheme, there may not be a central control point to control the network. What is important is that there is a scheduled period allocated for transmission of multiple packets of data from a source STA to a destination or target STA, in which other STAs within the network do not interfere or contend during the scheduled period. Typically, the scheduled SP/TXOP allocation allows multiple PPDUs to be transmitted from the source STA to the destination STA.

Figure 5:
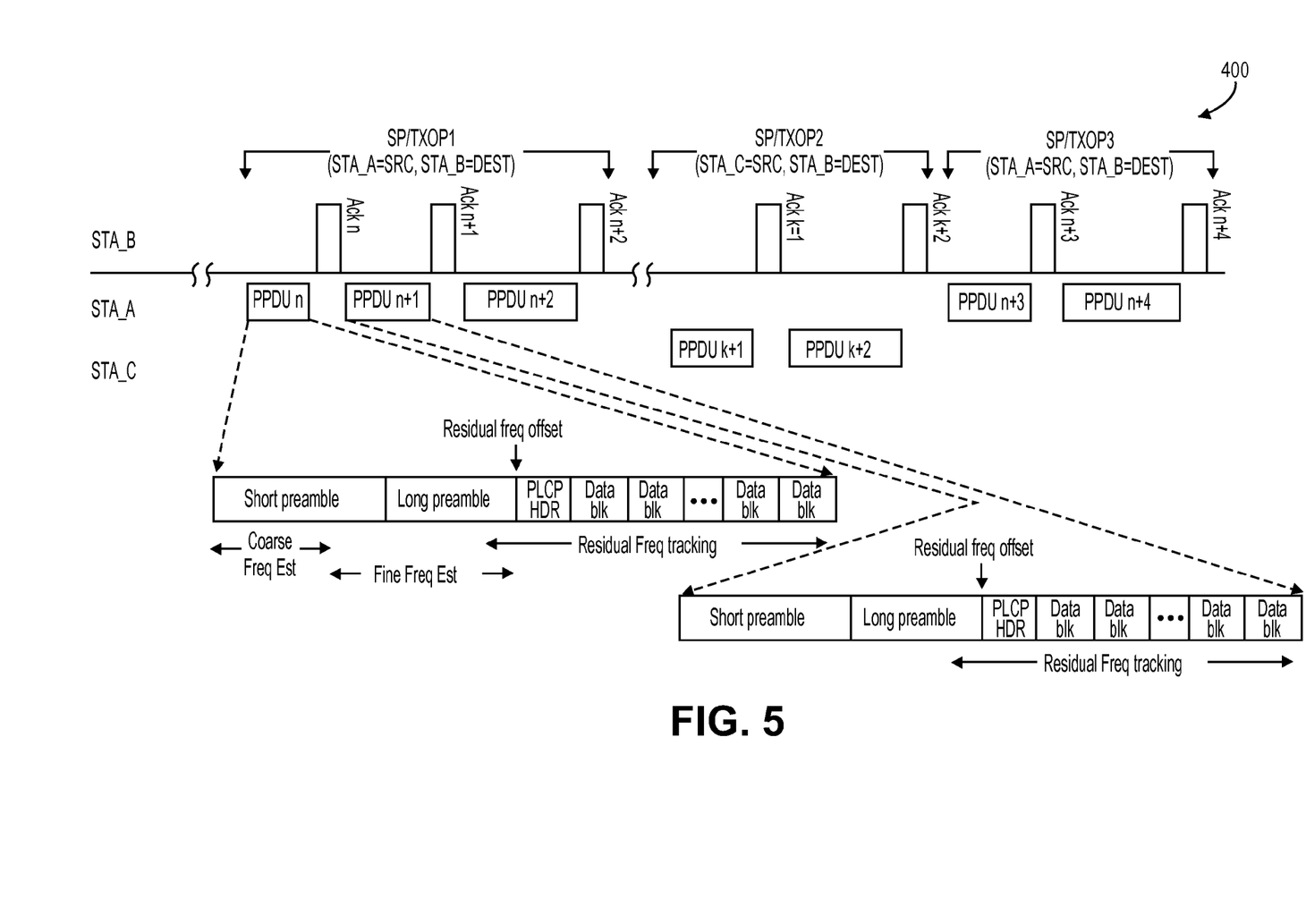
FIG. 5 is an illustration of one embodiment for practicing the invention in which short and long preambles of only the first packet in the service period is used to provide coarse and fine frequency offset, while residual frequency offset is tracked for each packet.

FIG. 5 shows one example transmission 400 for illustrating the practice of the invention. Transmission 400 shows three distinct service periods, noted as SP/TXOP1, SP/TXOP2 and SP/TXOP3. SP/TXOP1 is allocated for transferring data from STA_A to STA_B. Hence, STA_A is the source (SRC) and STA_B is the destination (DEST). SP/TXOP2 is allocated for transferring data from STA_C to STA_B and SP/TXOP3 is allocated for transferring additional data from STA_A to STA_B. It is to be noted that prior to the transmissions shown in FIG. 5, applicable requests for transmitting data were received from the requesting STA and schedules allocated in the respective SP/TXOP as shown. Note also in the example that the data transmission from STA_A to STA_B is performed in two separate scheduled periods (SP/TXOP1 and SP/TXOP3). Accordingly, SP/TXOP3 is shown having its first data packet noted as PPDU n+3.

During SP/TXOP1, three data packets, PPDU n, PPDU n+1 and PPDU n+2 are sent within the scheduled period. The source STA is STA_A. The destination STA (STA_B) replies with a response, which is shown as an acknowledgment (ACK), after receiving each PPDU. During SP/TXOP2, two packets, PPDU k+1 and PPDU k+2, are sent from STA_C to STA_B. During SP/TXOP3, two packets, are sent from STA_A to STA_B. The packets are labeled PPDU n+3 and PPDU n+4. These may be new data between STA_A and STA_B or continuation of the data from SP/TXOP1. It is to be noted that whether the SP scheme or the TXOP scheme is utilized, during the scheduled SP/TXOP1, the only communication permitted within the network is between STA_A and STA_B. Thus, during SP/TXOP1, destination STA (STA_B) knows that all PPDUs received during this period are from STA_A. Thus, STA_B is aware that packet traffic from any other source is not permitted. Likewise, during SP/TXOP2, the only communication permitted is between STA_C and STA_B and the destination STA (STA_B) is aware of this fact. During SP/TXOP3, the only communication permitted is between STA_A and STA_B again and STA_B is aware of this fact.

In reference to SP/TXOP1, when STA_B receives the first packet, PPDU n, the receiver uses the short preamble and the long preamble to estimate $\Delta f_{coarse+fine}$. Then with the PLCP header, or earlier, STA_B commences the residual frequency tracking to accumulate the residual frequency offset. The $\Delta f_{coarse+fine}$ estimation is combined with the currently tracked $\Delta f_{residual}$ value at each data block to provide the full $\Delta f$ compensation at each data block to recover the data. This is shown with the expansion of PPDU n in FIG. 3.

When the next packet (PPDU n+1) is received, STA_B knows that the packet is also from STA_A, since no other packet traffic is permitted during SP/TXOP1. Accordingly, there is no need to recalculate the $\Delta f_{coarse+fine}$ value, because this value was calculated in PPDU n and is not expected to change appreciably during the service period. If the original $\Delta f$ is saved, then this saved value may be used again as the starting point at the commencement of the PLCP header, or earlier, of PPDN n+1 for estimating $\Delta f$ for PPDN n+1. Therefore only $\Delta f_{residual}$ need be tracked for the data blocks of PPDU n+1.

Therefore, at the end of the first packet, PPDU n, the frequency offset between STA_A and STAB may be estimated as $\Delta f^n = \Delta f_{coarse+fine}^n + \Delta f_{residual}^n$. For the remaining duration of SP/TXOP1, the short and long preamble based $\Delta f_{coarse+fine}$ calculation is skipped. Note that the coarse and fine frequency estimations are not performed with PPDU n+1 in FIG. 5. Instead, STA_B uses the following procedure to estimate the frequency offset of the QoS traffic:

(1) For PPDU n+1, STA_B uses the previously saved frequency offset $\Delta f^n$ to initialize its frequency tracking loop as the initial frequency offset value for receiving packet PPDU n+1.

(2) At the end of the packet n+1, if its frequency tracking loop stays in lock, then STA_B saves its output as $\Delta f^{n+1}$ to initialize its frequency tracking loop as the initial frequency offset value for receiving packet PPDU n+2.

(3) The procedure is repeated for remaining packets in SP/TXOP1.

(4) Otherwise, restart from the short and long preamble based frequency offset estimation is performed.

Accordingly, the final $\Delta f$ value of each packet is saved and after the initial packet, the $\Delta f$ value of the previous packet is used as the initial starting value to commence the $\Delta f_{residual}$ tracking for the data blocks of that packet. This is performed for all data packets in a given SP/TXOP. Therefore, coarse and fine frequency estimations using the short and long preambles need be performed only once for all the packets in a given service period.

When the second service period SP/TXOP2 commences, STA_B is aware that the transmission is from a different source STA (STA_C, in this instance) and commences a new sequence for obtaining the frequency offset estimation with PPDU k+1. Short and long preambles of PPDU k+1 provides the new $\Delta f_{coarse+fine}$ for combining with $\Delta f_{residual}$ to provide $\Delta f^{k+1}$. The final value of $\Delta f^{k+1}$ at the end of PPDU k+1 is saved and used as the starting point for the next packet PPDU k+2 and only the residual values need be tracked with PPDU k+2. The process is repeated for the remaining packets in the service period SP/TXOP2 (if present).

With SP/TXOP3, STA_B may initialize the $\Delta f_{coarse+fine}$ offset estimation calculation with the short and long preambles of PPDU n+3 and run through the sequences as noted above. However, since SP/TXOP3 is a second transmission between STA_A and STA_B, the previously calculated $\Delta f$ may be used as an initialization value for PPDU n+3. Thus, in an alternative embodiment, if the time lapse between the two STAs is not significantly apart, then channel conditions are assumed to stay fairly constant between the two periods and PPDU n+3 is treated as a continuation of PPDU n+2 from SP/TXOP1. Therefore, the $\Delta f^{n+2}$ saved at the end of PPDU n+2 in STA_B is used as the initialization value for PPDU n+3 and only the residual frequency offset need be calculated for the packets in SP/TXOP3. As to what is regarded as an acceptable time lapse between service periods to use the saved $\Delta f$ from an earlier service period will depend on the system. In one embodiment, if the SP/TXOP is repeated in a transmission between the same two STAs in which the scheduling of the service period is provided in a given beacon interval, then the last saved $\Delta f$ from the previous service period may be used as the initializing offset value in the later service period between the same two STAs. In another embodiment, a designated time lapse or time separation may be set for using the saved $\Delta f$. It is to be noted that if the tracking loop is lost during any of the packets, then a new $\Delta f_{coarse+fine}$ may be determined using the short and long preambles.

Figure 6:
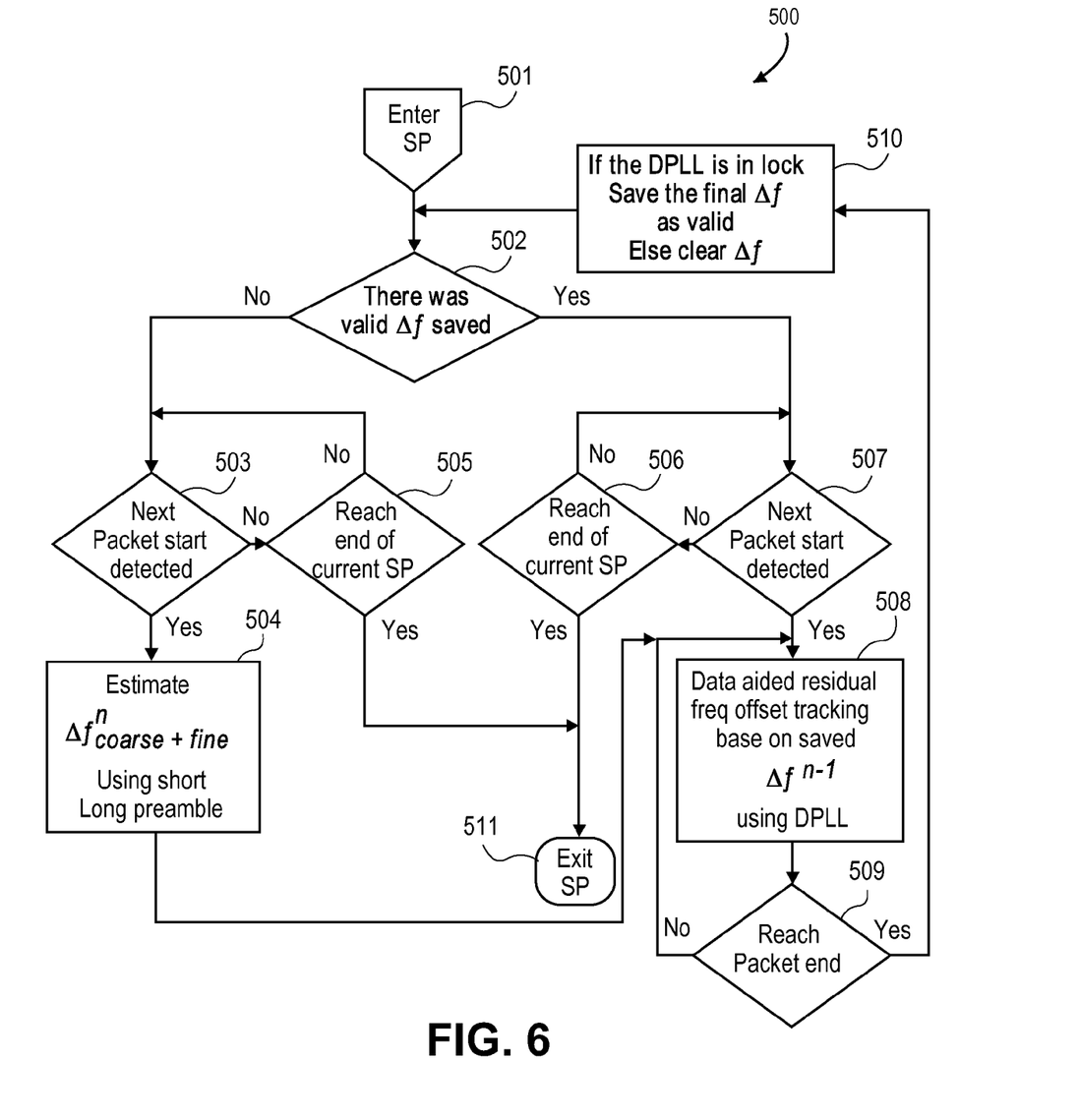
FIG. 6 is a flow chart showing a method for providing frequency offset estimation in a wireless receiver as one embodiment for practicing the invention.

FIG. 6 shows a flow chart for performing the method described above. The method is performed in an algorithm that is executed in a baseband processing module, such as baseband module 105 of FIG. 2. In other embodiments, other hardware, software or firmware may perform the described method. Furthermore, the described method is but one embodiment for practicing the invention. In FIG. 6, routine 500 commences when the receiver enters a particular service period (block 501). Then, the process determines if there is a valid $\Delta f$ saved for the service period (block 502). If the packet is the very first packet for the SP (and assuming that an earlier SP does not exist for the same source-destination pair, which saved a valid $\Delta f$) and there is no valid $\Delta f$ saved, when the packet start is detected (block 503), the short and long preambles for the packet are used to obtain $\Delta f_{coarse+fine}$ estimation (block 504). After obtaining the $\Delta f_{coarse+fine}$ estimation values, residual frequency offset tracking is commenced using a digital PLL (block 508) to obtain the $\Delta f_{residual}$ values (block 508) for the data blocks until the end of the packet is reached (block 509). The final $\Delta f$ value is saved (block 510) and the process returns to block 502.

With the subsequent packet(s), since there is a valid $\Delta f$ saved (block 502), the loop for calculating $\Delta f_{coarse+fine}$ is not executed. Instead, the other loop is taken and when the next packet is detected (block 507) the residual frequency offset continues utilizing the saved $\Delta f$ value as the start point for calculating the $\Delta f_{residual}$. With either loop, whenever the end of the current SP is reached (block 505, 506), the routine is exited (block 511). Thus, routine 500, which may be executed as an algorithm, provides for offset calculations to recover the data in subsequent packets of the same SP, by using the final $\Delta f$ value saved at the end of the previous packet as a starting value for tracking the $\Delta f_{residual}$ in the current packet to provide the frequency offset compensation to recover the data.

In those embodiments in which the same two stations have scheduled non-contiguous service period allocations, the final saved $\Delta f$ value of the earlier service period may be saved and applied as the starting point with the first packet in the next service period between the same two stations as described with reference to SP/TXOP1 and SP/TXOP3 in FIG. 5.

Figure 7:
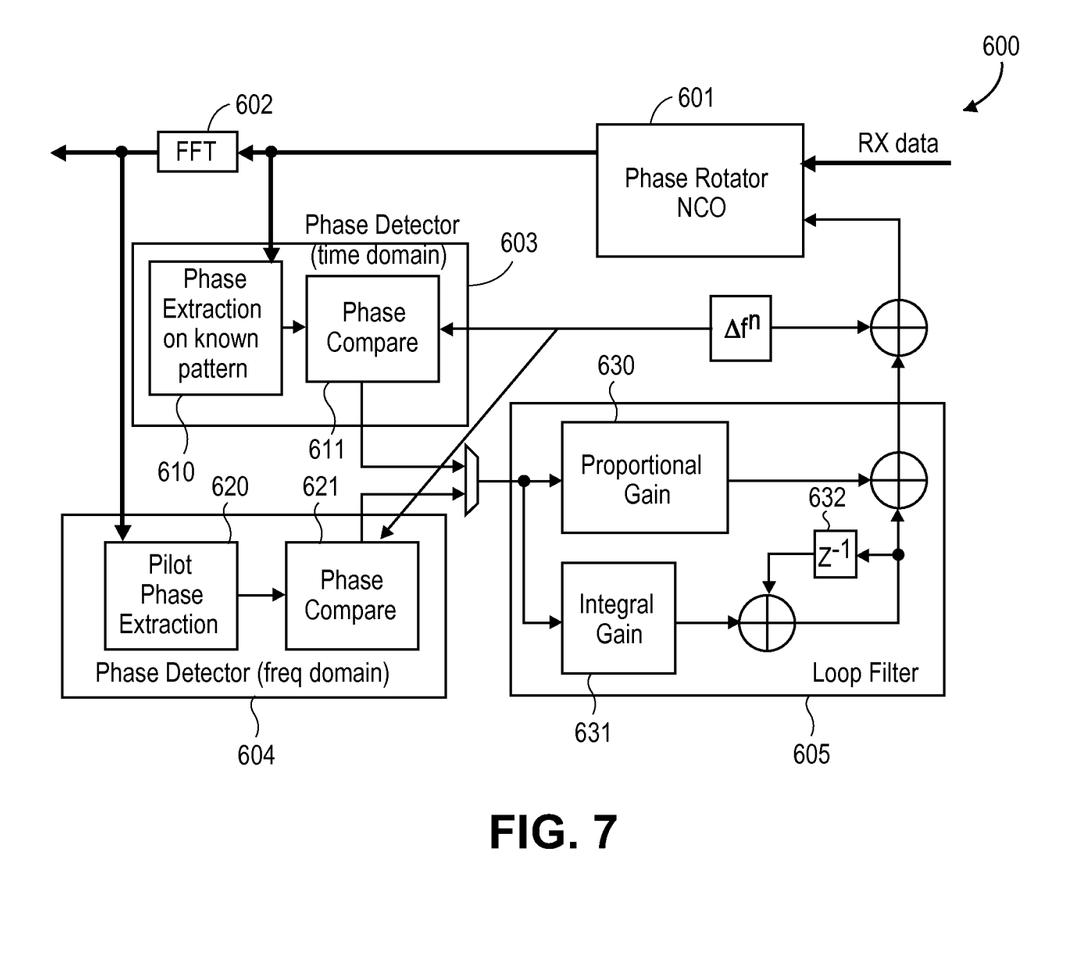
FIG. 7 is a block diagram of a digital phase locked-loop (DPLL), which is used as one embodiment of a circuit for tracking residual frequency offset in practicing one embodiment of the invention.

In the determination of the residual frequency offset $\Delta f_{residual}$ a variety of different techniques may be used, including prior art techniques. Typically a digital PLL (DPLL) is used to provide the $\Delta f_{residual}$ tracking for each data block. FIG. 7 shows one example DPLL 600 which may be used in practicing the invention. DPLL 600 may be part of the baseband module (such as baseband module 105 of FIG. 2) or it may be a separate component. DPLL 600 is comprised of three blocks, namely a phase detector (either a time domain phase detector 603 or frequency domain phase detector 604), loop filter 605 and a phase rotator NCO (Numerical Controlled Oscillator) 601. The phase information extraction and comparison algorithm used in phase detection may be either frequency domain algorithm (with the outer loop having phase detector 604) or time domain algorithm (with the inner loop having phase detector 603). A Fast-Fourier Transform block 602 is coupled to provide the conversion from the time domain to frequency domain. It is to be noted that either phase detector 603, 604 may be selected. The selection of which detector to use may have impact on the complexity of the algorithm, as well as loop bandwidth.

The phase information used in the phase detector is extracted from known inband patterns. For example, the pilot tones in OFDM phy (physical unit) or the known data-aided pattern in Single-Carrier (SC) phy may be used. Thus, detector 603 uses a phase extractor 610 and phase comparator 611, while detector 604 uses a pilot phase extractor 620 and phase comparator 621. The output of the selected phase detector is multiplied by both the proportional gain (block 630) and integral gain (block 631) within loop filter 605. A $Z^{-1}$ feedback 632 is utilized within loop filter 605 to obtain the current accumulated $\Delta f_{residual}$ value, which is sent to NCO 601 for use with the next data to calculate the next $\Delta f_{residual}$. Note that $\Delta f''$ is the saved $\Delta f$ value which is used as input to the selected phase comparator, as well as at the output of loop filter 605.

Accordingly, a frequency offset estimation scheme is described. As noted, the described technique shortens the time required to obtain the frequency offset estimation, since $\Delta f_{coarse+fine}$ calculations need not be performed for every packet in a service period. The invention is useful for protocols utilizing a scheduled service period, such as the proposed 60 GHz protocols currently being developed that has stringent QoS requirements. However, the invention need not be limited to the 60 GHz protocol. As long as there is a defined scheduled allocation time for packets to be transferred between two devices, where other devices do not interfere, the embodiments of the invention may be practiced to provide frequency offset estimation.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more corresponding functions and may further include inferred coupling to one or more other items.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. A method comprising:
   receiving a plurality of packets transmitted within a first service period allocated for transferring data from a first device to a second device in a network, wherein other devices are aware of the allocated first service period so as not to interfere with the first service period and wherein the second device is aware that the first device is a source of the data being transmitted during the first service period;
   estimating coarse frequency offset estimation and fine frequency offset estimation from preambles of a first packet of the plurality of packets transmitted from the first device during the first service period;
   tracking and estimating residual frequency offset for data components of the first packet;
   combining the residual frequency offset for each data component of the first packet with the estimated coarse and fine frequency offsets to obtain a total frequency offset for each data component of the first packet;
   saving a final total frequency offset at end of the first packet;
   utilizing the saved final total frequency offset for the first packet as an initial value for determining frequency offset estimation in a second packet in the plurality of packets within the first service period;
   tracking and estimating residual frequency offset for data components of the second packet; and
   combining the residual frequency offset for each data component of the second packet with the saved final total frequency offset for the first packet to obtain a respective total frequency offset for each data component of the second packet.

2. The method of claim 1, wherein for each subsequent packet in the plurality of packets for the first service period, a saved final total frequency offset from a respective previous packet is used as a starting point for obtaining residual frequency offset in a subsequent packet, instead of calculating a coarse frequency offset estimation and fine frequency offset estimation for each packet in the first service period.

3. The method of claim 2, wherein the packets are transmitted in a 60 GHz band.

4. The method of claim 2, wherein the packets are transmitted in a 60 GHz band and the service period is specified by a protocol applicable to the 60 GHz band.

5. The method of claim 2, further including:
   receiving a plurality of packets transmitted within a second service period allocated for transferring data from the first device to the second device;
   utilizing the saved final total frequency offset for a last packet of the first service period as an initial value for determining frequency offset estimation in a first packet in the plurality of packets within the second service period;
   tracking and estimating residual frequency offset for data components of the first packet of the second service period; and
   combining the residual frequency offset for each data component of the first packet with the saved final total frequency offset for the last packet of the first service period to obtain a total frequency offset for each data component of the first packet of the second service period.

6. The method of claim 5, wherein the first and second service periods are scheduled within a designated time separation.

7. A method comprising:
   entering a first service period at a destination device in which a receiver of the destination device receives a plurality of packets transmitted from a source device, wherein the first service period is allocated for transferring data from the source device to the destination device within a network and wherein other devices within the network are aware of the allocated first service period so as not to interfere with the data being transmitted from the source device to the destination device, the destination device also aware of the source device transmitting data during the first service period;

estimating coarse frequency offset estimation from a short preamble of a first packet of the plurality of packets transmitted from the source device during the first service period;

estimating fine frequency offset estimation from a long preamble of a first packet of the plurality of packets transmitted from the source device during the first service period;

combining the coarse and fine frequency offset estimation;

tracking and estimating residual frequency offset for data components of the first packet;

combining the residual frequency offset for each data component of the first packet with the estimated coarse and fine frequency offsets to obtain a total frequency offset for each data component of the first packet;

saving a final total frequency offset at end of the first packet;

utilizing the saved final total frequency offset for the first packet as an initial value for determining frequency offset estimation in a second packet in the plurality of packets within the first service period;

tracking and estimating residual frequency offset for data components of the second packet; and combining the residual frequency offset for each data component of the second packet with the saved final total frequency offset for the first packet to obtain a total frequency offset for each data component of the second packet.

8. The method of claim 7, wherein for each subsequent packet in the plurality of packets for the first service period, a saved final total frequency offset from a respective previous packet is used as a starting point for obtaining residual frequency offset in a subsequent packet, instead of calculating a coarse frequency offset estimation and fine frequency offset estimation for each packet in the first service period.

9. The method of claim 8, wherein the packets are transmitted in a 60 GHz band.

10. The method of claim 8, wherein the packets are transmitted in a 60 GHz band and the service period is specified by a protocol applicable to the 60 GHz band.

11. The method of claim 8, further including:

receiving a plurality of packets transmitted within a second service period allocated for transferring data from the source device to the destination device;

utilizing the saved final total frequency offset for a last packet of the first service period as an initial value for determining frequency offset estimation in a first packet in the plurality of packets within the second service period;

tracking and estimating residual frequency offset for data components of the first packet of the second service period; and combining the residual frequency offset for each data component of the first packet with the saved final total frequency offset for the last packet of the first service period to obtain a total frequency offset for each data component of the first packet of the second service period.

12. The method of claim 11, wherein the first and second service periods are scheduled within a designated time separation.

13. An apparatus comprising:

a receiver of a destination device to receive a plurality of packets transmitted from a source device, wherein a first service period is allocated for transferring data from the source device to the destination device within a network and wherein other devices within the network are aware of the allocated first service period so as not to interfere with the data being transmitted from the source device to the destination device, the destination device also aware of the source device transmitting data during the first service period;

a baseband module of the destination device coupled to the receiver to estimate coarse frequency offset estimation from a short preamble of a first packet of the plurality of packets transmitted from the source device during the first service period, to estimate fine frequency offset estimation from a long preamble of a first packet of the plurality of packets transmitted from the source device during the first service period, and to combine the coarse and fine frequency offset estimation; and a digital phase locked-loop coupled to the baseband module to track and estimate residual frequency offset for data components of the first packet;

wherein the baseband module combines the residual frequency offset for each data component of the first packet with the estimated coarse and fine frequency offsets to obtain a total frequency offset for each data component of the first packet, saves a final total frequency offset at end of the first packet, utilizes the saved final total frequency offset for the first packet as an initial value for determining frequency offset estimation in a second packet in the plurality of packets within the first service period, tracks and estimates residual frequency offset for data components of the second packet, and combines the residual frequency offset for each data component of the second packet with the saved final total frequency offset for the first packet to obtain a total frequency offset for each data component of the second packet.

14. The apparatus of claim 13, wherein for each subsequent packet in the plurality of packets for the first service period, a saved final total frequency offset from a respective previous packet is used as a starting point for obtaining residual frequency offset in a subsequent packet, instead of calculating a coarse frequency offset estimation and fine frequency offset estimation for each packet in the first service period.

15. The apparatus of claim 14, wherein the packets are transmitted in a 60 GHz band.

16. The apparatus of claim 14, wherein the packets are transmitted in a 60 GHz band and the service period is specified by a protocol applicable to the 60 GHz band.

17. The apparatus of claim 14, further including:

the receiver receiving a plurality of packets transmitted within a second service period allocated for transferring data from the source device to the destination device;

the baseband module to utilize the saved final total frequency offset for a last packet of the first service period as an initial value for determining frequency offset estimation in a first packet in the plurality of packets within the second service period;

the digital phase locked-loop to track and estimate residual frequency offset for data components of the first packet of the second service period; and the baseband module to combine the residual frequency offset for each data component of the first packet with the saved final total frequency offset for the last packet of the first service period to obtain a total frequency offset for each data component of the first packet of the second service period.

18. The apparatus of claim 17, wherein the first and second service periods are scheduled within a designated time separation.

* * * * *